No. 749,879. PATENTED JAN. 19, 1904.
H. L. PERRYMAN.
BUCKLE.
APPLICATION FILED AUG. 7, 1902.
NO MODEL.
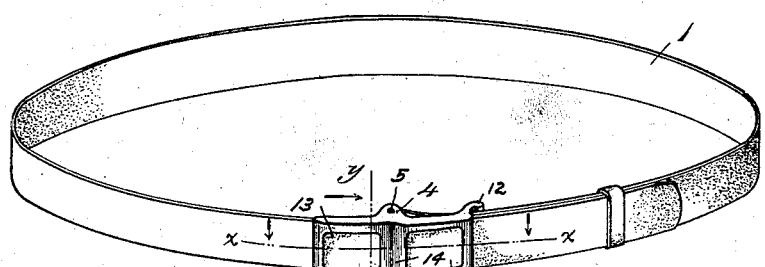
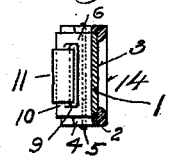
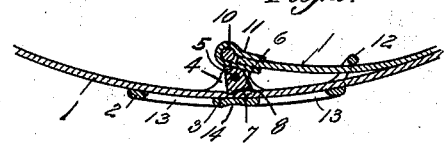
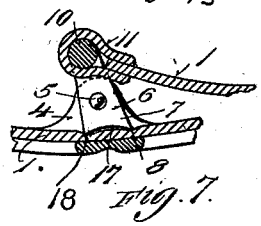
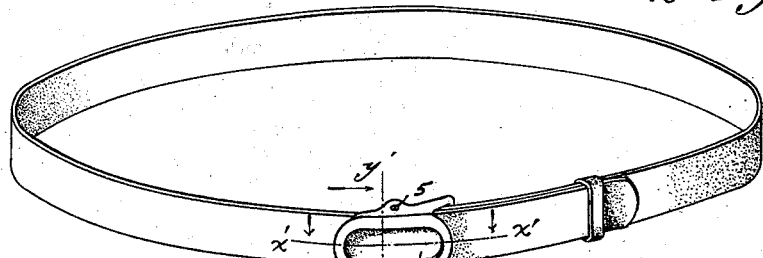
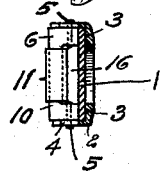
WITNESSES:
J. C. Dawley
Will O'Laughlin
INVENTOR.
Henry L. Perryman
BY
ATTORNEY.

No. 749,879.

Patented January 19, 1904.

UNITED STATES PATENT OFFICE.

HENRY L. PERRYMAN, OF SPRINGFIELD, OHIO.

BUCKLE.

SPECIFICATION forming part of Letters Patent No. 749,879, dated January 19, 1904.

Application filed August 7, 1902. Serial No. 118,712. (No model.)

*To all whom it may concern:*

Be it known that I, HENRY L. PERRYMAN, a citizen of the United States, residing at Springfield, in the county of Clark and State of Ohio, have invented certain new and useful Improvements in Buckles, of which the following is a specification, reference being had therein to the accompanying drawings.

This invention relates to buckles, and has for its object to provide a device of this description adapted for general use, whereby the free end of a belt or strap may be readily engaged or disengaged and firmly held during such engagement, the structure being simple and inexpensive and adapted to grip the strap or belt at any point of its length.

To these ends my invention consists in certain novel features, which I will now proceed to describe and will then particularly point out in the claims.

In the accompanying drawings, Figure 1 is a perspective view illustrating one form of my invention as applied to a belt for personal wear. Fig. 2 is an enlarged detail sectional view taken on the line $x\,x$ of Fig. 1 and looking in the direction of the arrows. Fig. 3 is a similar view taken on the line $y\,y$ of Fig. 1 and looking in the direction of the arrows. Fig. 4 is a view similar to Fig. 1, illustrating a modified form of my invention. Fig. 5 is an enlarged detail sectional view taken on the line $x'\,x'$ of Fig. 4 and looking in the direction of the arrows. Fig. 6 is a similar view taken on the line $y'\,y'$ of Fig. 4 and looking in the direction of the arrows, and Fig. 7 is an enlarged detail view of a portion of Fig. 2.

In the accompanying drawings I have shown my invention as applied to a belt for personal wear, although I wish it to be understood that my improved buckle is capable of general application.

In the said drawings, 1 indicates the belt, and 2 the body or frame of the buckle, which may be of any suitable form, it being shown rectangular in Figs. 1, 2, and 3 and of elliptical shape in Figs. 4, 5, and 6. On its rear face this body or frame is provided with a flat bearing-surface 3, the term "flat" being used in this connection in the sense of a bearing-surface substantially smooth and free from projections such as are sometimes used to aid the tongue in holding the belt or strap by bending it at sharp angles and gripping it against such projections, so that said flat surface need not necessarily be a true plane surface. The body 2 of the buckle may be of any suitable form—as, for instance, the rectangular form shown in Figs. 1, 2, and 3, where said body is cut away, as shown at 13, on each side of a central cross-bar 14, the rear face of which in conjunction with the adjacent portions of the frame or body 2 constitute the bearing-surface 3, which in this instance extends across the entire inner face of the body.

In Figs. 4, 5, and 6 I have shown a frame or body 2 elliptical in form, the central portion being entirely cut away, as indicated at 15, the cross-bar 14 being omitted and the flat bearing-surface 3 being located in two separated parts on the rear face of the body 2 on each side of the opening 15.

On each side of the body 2 of the buckle there extends outward from the back of said body a lug 4, and to these lugs is pivoted the tongue of the buckle, (indicated as a whole by the reference-numeral 6,) its pivotal axis being indicated at 5. This tongue is in the shape of a bar extending across the back of the buckle, that portion thereof between the pivotal axis and the bearing-surface 3 constituting the engaging portion of the tongue and being indicated by the reference-numeral 7. Said engaging portion 7 of the tongue 6 terminates in separated engaging edges 8 and 18, which are located at different distances from the pivotal axis 5 of the tongue. The face of the tongue lying between said edges 8 and 18 is recessed or hollowed out, as indicated at 17, to form a clearance-space between the engaging edges for the purpose hereinafter set forth. The engaging edge 18 is nearer the pivotal axis 5 than the engaging edge 8. The portion of the tongue 6 lying on the opposite side of the pivotal axis 5 from the engaging portion 7 thereof constitutes the free portion of said tongue, as distinguished from the engaging portion, and said free portion is provided with a slot or aperture 9, forming a bar 10. Said slot 9 and bar 10 form means for connecting to the free portion of the tongue the attached end of the belt or strap 1, this connection being preferably effected by a loop 11, secured to the end of the belt. The body 2 may be provided with the usual guiding-loop 12 for the passage of the belt.

When the body 2 of the buckle is provided with the cross-bar 14 and a continuous bearing-surface 3, the tongue 6 has a continuous engaging portion 7 coextensive therewith; but when the cross-bar 14 is omitted, as in the form shown in Figs. 4, 5, and 6, the central portion of the engaging portion 7 of the tongue is cut away, as indicated at 16.

The buckle thus constructed operates in the following manner: Considering Figs. 2 and 7 for purpose of illustration, when it is desired to insert the free end of the belt in the buckle the lower or engaging portion 7 of the tongue is swung to the right in said figures, so that the tongue is approximately parallel to the bearing-surface 3, thus forming a space into which the free end of the belt may be inserted from the left toward the right. The lower or engaging portion of the tongue is then swung from right to left in said figures, in which movement the engaging edge 18 first comes into contact with the belt and compresses it sufficiently to allow said edge to pass the perpendicular or shortest line connecting the bearing-surface 3 with the pivotal axis 5. The distance from the pivotal axis 5 to the edge 18 is sufficient to permit this, and the reaction of the compressed leather after the edge 18 has passed the perpendicular or shortest line just referred to presses said edge upward and outward to the left in Figs. 2 and 7 and tends to bring the second engaging edge 8 down upon the leather of the belt with a snap. The second engaging edge 8 then engages the free end of the belt and grips it firmly against the bearing-surface 3, and any pull upon the free end of the belt toward the left in Figs. 2 and 7 will only tend to cause the edge 8 to grip the leather more securely. At the same time the first edge 18 serves as a locking device to prevent the lower or engaging portion of the tongue from accidentally swinging to the right in Figs. 2 and 7, since to move in this direction the edge 18 must again compress the belt to permit such movement. The recessing or cutting away of the lower face of the tongue, as shown at 17, forms a clearance-space which permits this mode of operation and which imparts to the engaging edges 8 and 18 relatively acute angles. If this face of the tongue were flat, said face would bear upon the leather with a constantly-increasing pressure after the engagement therewith of the edge 18 and the snap and locking action above referred to would be entirely absent. With the present construction the buckle becomes self-locking and is prevented from accidentally loosening its grip on the belt even when there is no strain on said belt. It will be understood, of course, that when the belt is tightened around the body of the wearer or around any other body the natural reaction or resistance which the body thus inclosed or encircled by the belt exerts upon the belt will after the engagement of the parts of the buckle just described serve to aid in maintaining this engagement. This is so partly because the attached end of the belt tends to pull the free portion of the tongue to the right in Fig. 7, thereby moving the engaging portion 7 to the left in said figure, and thus tightening the grip of the engaging edge 8 on the belt. A further reason for this is that when the engaging edge 8 engages the free end of the belt any pull on said free end to the left in Fig. 7 will tend to tighten its grip on the belt. The buckle may be disengaged by pressing the upper end of the tongue to the left in Fig. 7, causing the engaging edge 18 to compress the belt sufficiently to swing to the right past the perpendicular or shortest line connecting the pivotal axis 5 and bearing-surface 3, whereupon the tongue may be moved into parallelism with the body of the buckle and the free end of the belt may be withdrawn.

I do not wish to be understood as limiting myself to the precise details of construction hereinbefore described, and shown in the accompanying drawings, as it is obvious that these details may be modified without departing from the principle of my invention.

Having thus fully described my invention, what I claim as new, and desire to secure by Letters Patent, is—

1. A buckle comprising a frame or body having a flat bearing-surface on its rear face, in combination with a tongue pivoted to said frame or body, so as to swing across said bearing-surface, the engaging portion of the tongue terminating in separated engaging edges located at different distances from the pivotal axis and having a clearance-space between them, the engaging edge nearest said axis forming a locking device to hold the tongue in engaging position, and the engaging edge farthest from the pivotal axis serving to grip the belt or strap against the bearing-surface, substantially as described.

2. A buckle comprising a frame or body having a flat bearing-surface on its rear face, in combination with a tongue pivoted to said frame or body, so as to swing across said bearing-surface, the pivotal axis of the tongue lying between its engaging and free portions, its free portion having the attached end of the belt or strap connected thereto, the other or engaging portion of the tongue terminating in separated engaging edges located at different distances from the pivotal axis and having a clearance-space between them, the engaging edge nearest said axis forming a locking device to hold the tongue in engaging position, and the engaging edge farthest from the pivotal axis serving to grip the belt or strap against the bearing-surface, substantially as described.

3. A buckle comprising a frame or body having a flat bearing-surface on its rear face, in combination with a tongue pivoted to said frame or body, so as to swing across said bearing-surface, the engaging portion of the tongue terminating in separated engaging edges located at different distances from the pivotal axis and having a clearance-space between them, the engaging edge nearest said axis being adapted to pass the shortest line between the bearing-surface and pivotal axis by compressing the free end of the belt or strap against said bearing-surface, so as to act as a locking device, the engaging edge farthest from the pivotal axis being at such a distance therefrom as to prevent its passing said line when the free end of the belt or strap is in position in the buckle, whereby said second engaging edge is adapted to grip said free end between it and the bearing-surface, substantially as described.

4. A buckle comprising a frame or body having a flat bearing-surface on its rear face, in combination with a tongue pivoted to said frame or body, so as to swing across said bearing-surface, the pivotal axis of the tongue lying between its engaging and free portions, the free portion of the tongue having the attached end of the belt or strap connected thereto, the other or engaging portion of the tongue terminating in separated engaging edges located at different distances from the pivotal axis and having a clearance-space between them, the engaging edge nearest said axis being adapted to pass the shortest line between the bearing-surface and pivotal axis by compressing the free end of the belt or strap against said bearing-surface, so as to act as a locking device, the engaging edge farthest from the pivotal axis being at such a distance therefrom as to prevent its passing said line when the free end of the belt or strap is in position in the buckle, whereby said second engaging edge is adapted to grip said free end between it and the bearing-surface, substantially as described.

In testimony whereof I affix my signature in presence of two witnesses.

HENRY L. PERRYMAN.

Witnesses:
E. O. HAGAN,
IRVINE MILLER.